(12) United States Patent
Fuse

(10) Patent No.: US 6,411,702 B1
(45) Date of Patent: Jun. 25, 2002

(54) INTELLIGENT NETWORK CAPABLE OF EXECUTING A PLURALITY OF SERVICE CONTROL REQUEST MESSAGES IN A SINGLE SERVICE CONTROL POINT

(75) Inventor: Motonari Fuse, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/178,646

(22) Filed: Oct. 26, 1998

(30) Foreign Application Priority Data

Oct. 24, 1997 (JP) .............................................. 9-292130

(51) Int. Cl.[7] .............................................. H04M 7/00
(52) U.S. Cl. .............................. 379/221.09; 379/221.08
(58) Field of Search ................................ 379/201, 207, 379/220, 221, 230, 229

(56) References Cited

U.S. PATENT DOCUMENTS 5,455,852 A * 10/1995 Elrod et al. .................... 379/67
5,664,102 A * 9/1997 Faynberg .................... 709/246
5,963,630 A * 10/1999 Dabbs et al. ................ 379/201
6,111,893 A * 8/2000 Volftsun et al. ............ 370/466

FOREIGN PATENT DOCUMENTS

EP          620 693       10/1994

OTHER PUBLICATIONS

Database WPI, Section EI, Week 199730, May 16, 1997 Derwent Publications Ltd., London, GB; Class W01, AN 1997-326652.XP002127385 & JP 09 130476 (NEC Corp), Oct. 30, 1995.

* cited by examiner

Primary Examiner—Creighton Smith
Assistant Examiner—Hector Agdeppa
(74) Attorney, Agent, or Firm—Foley & Lardner

(57) ABSTRACT

The invention provides with a method for simplifying call control to a plurality of call models and development of an SSP. An SCP call control system according to the invention is operable to store parameters in an SCP call message depending on its structural information and access the parameters by using the structural information regardless a structure of the message, when the message is received.

4 Claims, 7 Drawing Sheets

INTELLIGENT NETWORK CAPABLE OF EXECUTING A PLURALITY OF SERVICE CONTROL REQUEST MESSAGES IN A SINGLE SERVICE CONTROL POINT

BACKGROUND OF THE INVENTION

This invention relates to a call control system for use in a SCP (Service Control Point) included in an intelligent network (which will often be abbreviated to an IN).

Nowadays, consideration has been directed toward making a network highly intelligent in order to respond to a wide variety of requirements for communications. Such consideration might become more important in connection with an advanced communication network as well as a broadband network and a personalized network. Heretofore, an IN (Intelligent Network) has been proposed so as to make a network highly intelligent.

In such an IN, a plurality of intelligent peripherals (will be abbreviated to IP) and a plurality of vender feature nodes (VFN) are used as terminal devices. Each of the terminal devices is connected to a service control point (will be abbreviated to SCP) through a service switching point (will be simply called SSP) which is operable in a manner similar to a conventional exchange. Each of the SCPs is managed by a service management system (SMS) which has a database.

In a conventional IN, high intelligence is not given to each SSP but is concentrated into each SCP to which the SSP is connected by transmitting a service control request message from the SSP to the SCP. The SCP executes a call control operation in accordance with a service control request message to provide service to a user connected through the SSP to each terminal device. The call control operation is peculiar to or determined by the service control request message.

From this fact, it is understood in the conventional IN that the SCP should be designed to respond to the service control request message and can provide the service to each user as long as the service control request message has the format determined for the SCP.

Herein, the SSP may not always be connected to the terminal devices which have the service control request message of the same format but may be connected to a plurality of the terminal devices which are different in species from one another. In this case, the SCP is supplied from each of the terminal devices through the SSP with a service control request message of a format which is different from one another to specify the species of the terminal devices.

In addition, a new model of the SSP may be partially substituted into the IN for an old model of the SSP and may be connected to the SCP in common with the old model SSP. This results in coexistence of the old and the new model SSPs in the conventional IN.

Under these circumstances, each SCP in the conventional IN can neither respond to the different service control request messages nor can cope with the coexistence of the old and the new model SSPs.

SUMMARY OF THE INVENTION

It is an object of this invention to provide an intelligent network (IN) which can conveniently respond to a plurality of service control request messages which are different from each other.

It is another object of this invention to provide an intelligent network (IN) of the type described, which can allow both old and new model SSPs to be connected to a common SCP.

It is yet another object of this invention to provide an SCP which is applicable to an IN of the type described.

It is still another object of this invention to provide a method of controlling a plurality of service control request messages in a single SCP used in the IN.

An SCP call control system according to the invention comprises at least one SCP and a plurality of SSPs which are configured to send service control request messages each including a source address. The SCP comprises a call model determining unit which extracts a source address from the received call control request message and which determines a call model corresponding to the source address, a call model switching unit which switches to a resource address of the determined call model, a resource managing unit which manages a resource of a currently used call model, and a resource accessing unit which allows a service logic program actually providing a service to access the switched resource.

According to the invention, plural kinds of service control request messages can be treated in a single SCP.

BRIEF DESCRIPTION OF THE DRAWING

FIG. 2 shows a block diagram of an IN according to a preferred embodiment of this invention so as to describe a call control operation which is executed in a service control point (SCP) in the IN;

DESCRIPTION OF THE PREFERRED EMBODIMENT

Figure 1:
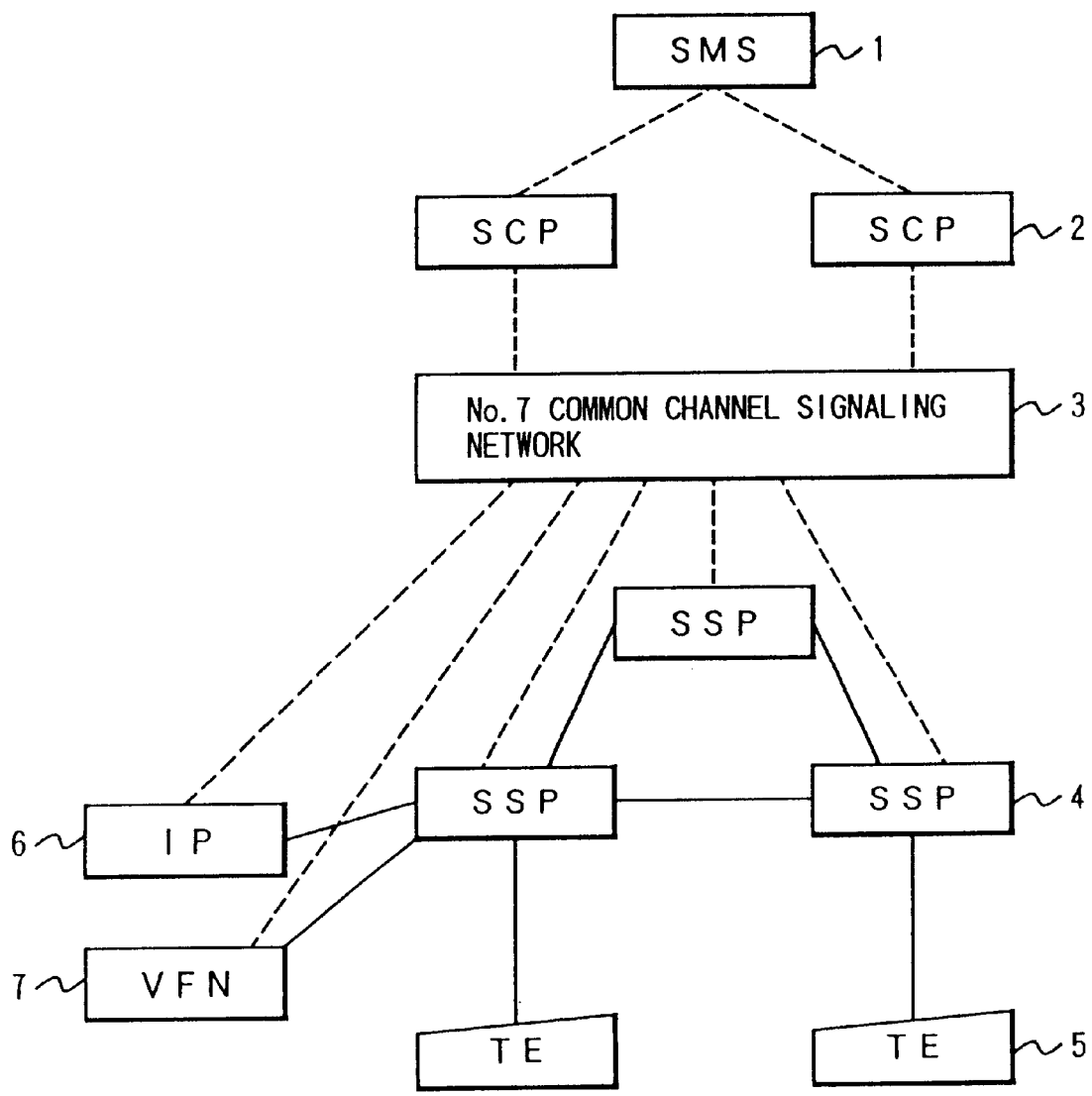
FIG. 1 shows a block diagram for use in describing a conventional intelligent network (IN)

Referring to FIG. 1, a conventional intelligent network (IN) will first be described for a better understanding of this invention. The illustrated intelligent network (IN) has a plurality of terminal devices, such as terminal equipment (TE) 5, intelligent peripherals (IP) 6, and vender feature nodes (VFN) 7, a plurality of SSPs 4 connected to the terminal devices, a plurality of SCPs 2 connected to the SSPs 4 through a common channel signal network of the No. 7 type, and a service management system (SMS) 1. Among the terminal devices, the IP 6 is located at a subscriber site and provides an advanced facility to the subscriber while the VFN 7 is managed by a vendor.

The illustrated SSPs 4 (Service Switching Point) each correspond to an exchange located in a conventional network. The SSPs 4, however, have no advanced intelligence, but the advanced intelligence is concentrated in the SCPs 2. Also, SCPs 2 and SSPs 4 are connected through a common channel signaling network of the No. 7 type (SS7), and commands and data are transmitted between the SCPs 2 and SSPs 4 via the network.

Furthermore, SCPs 2 are provided with some centralized databases and respond to requests from the SSPs 4. There is an SMS 1 (Service Management System) at a higher layer than that of the SCPs 2. The SMS 1 is connected to the SCPs 2 through an x.25 data network. In the database provided with the SMS 1, common data pertaining to its area is stored.

In the above-mentioned system, a variety of terminal devices may be connected to each SSP.

For call control between an SSP and an SCP, the SSP uses a method dedicated to its own type. As a result, a type of SSP is sent as a service control request message in a format which is different from another type of SSP. The methods are defined as "call model" in this specification.

In the past, dedicated SCPs are developed for each call model. Therefore, it is impossible that a single SCP is simultaneously connected to a plurality of SSPs each of which uses a call model which is different from any call model used by the other SSPs (for example, different INAP (intelligent network application protocol)). As a result, the SCP can simultaneously execute processing for the connected SSPs. If a single SCP is connected for plural kinds of call models, the SCP needs to individually start a process for each call model and distribute the service control request messages according to its call model.

Figure 2:
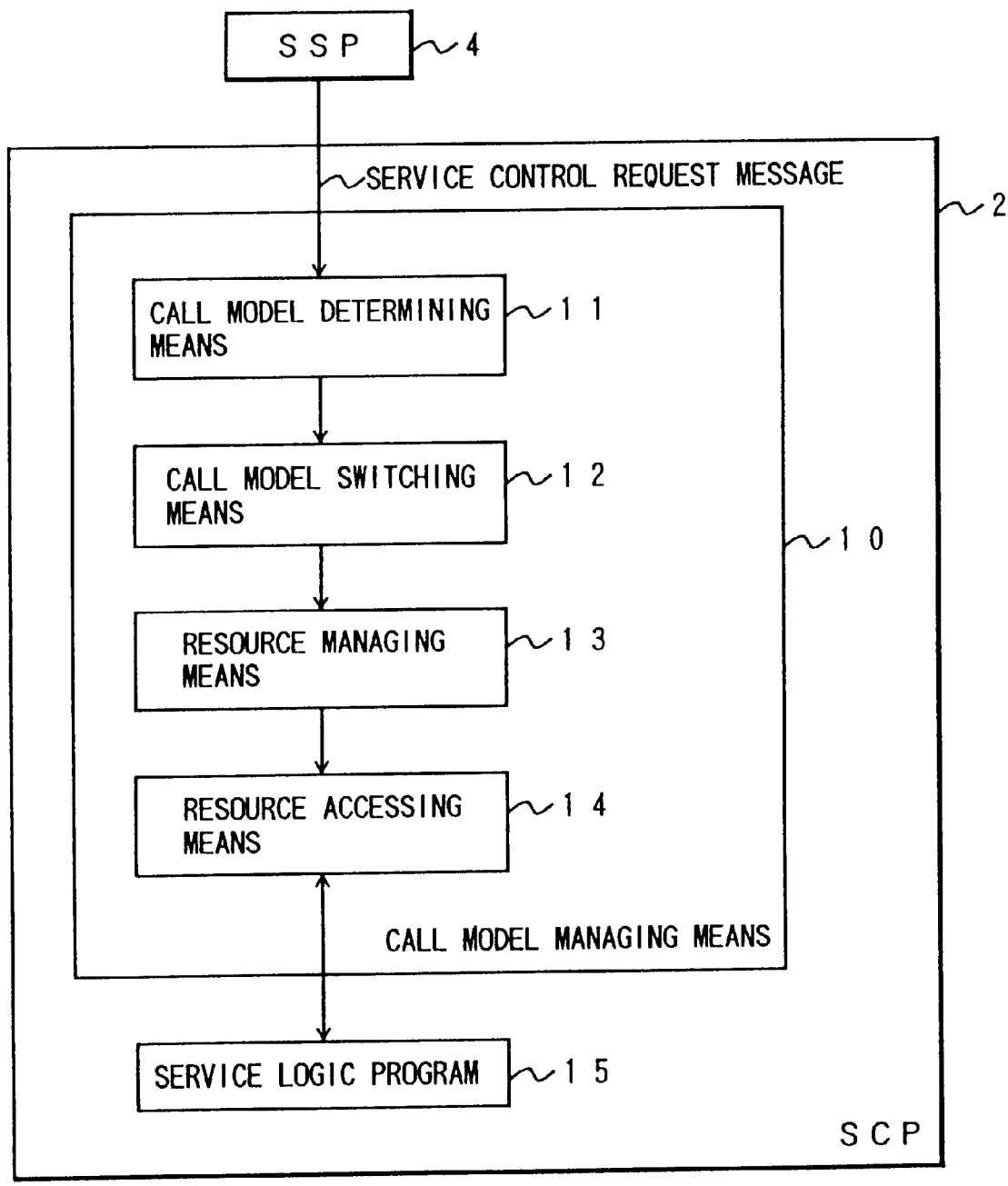

Referring to FIG. 2, a block diagram representing an embodiment of the invention is shown. In FIG. 2, an SSP 4 is connected to an SCP 2 through a common channel signaling network which is not shown in FIG. 2. The SCP 2 is provided with a call model managing unit 10 and a service logic program 15.

The call model managing unit 10 further comprises four kinds of units, that is, a call model determining unit 11, a call model switching unit 12, a resource managing unit 13, and a resource accessing unit 14. Hereinafter, each of the units will be described in detail.

The call model determining unit 11 determines a call model based on a resource address in a service control request message.

The call model switching unit 12 provides the call model determined by the call model determining unit 11 to the resource managing unit 13.

The resource managing unit 13 includes resources for each call model. The resource includes structure definitions and storage region of service control request messages in a call model.

In this specification, the structure definitions and storage regions of the messages in a call model are collectively referred to as a "resource". Also an address of an area including a set of pointers each of which points to the structure definition or storage region is referred to as a "resource address".

The resource accessing unit 14 allows the service logic program 15 to access the resources in the resource managing unit 13 in the same manner even if the call model is changed. Therefore, when the call model is changed, it is not necessary for the service logic program 15 to consider its interface with the resource managing unit 13 in accessing the resources.

Also, the service logic program 15 operates according to information modified by the call model managing unit 10 based on the service control request message sent from the SSP 4.

Figure 3:
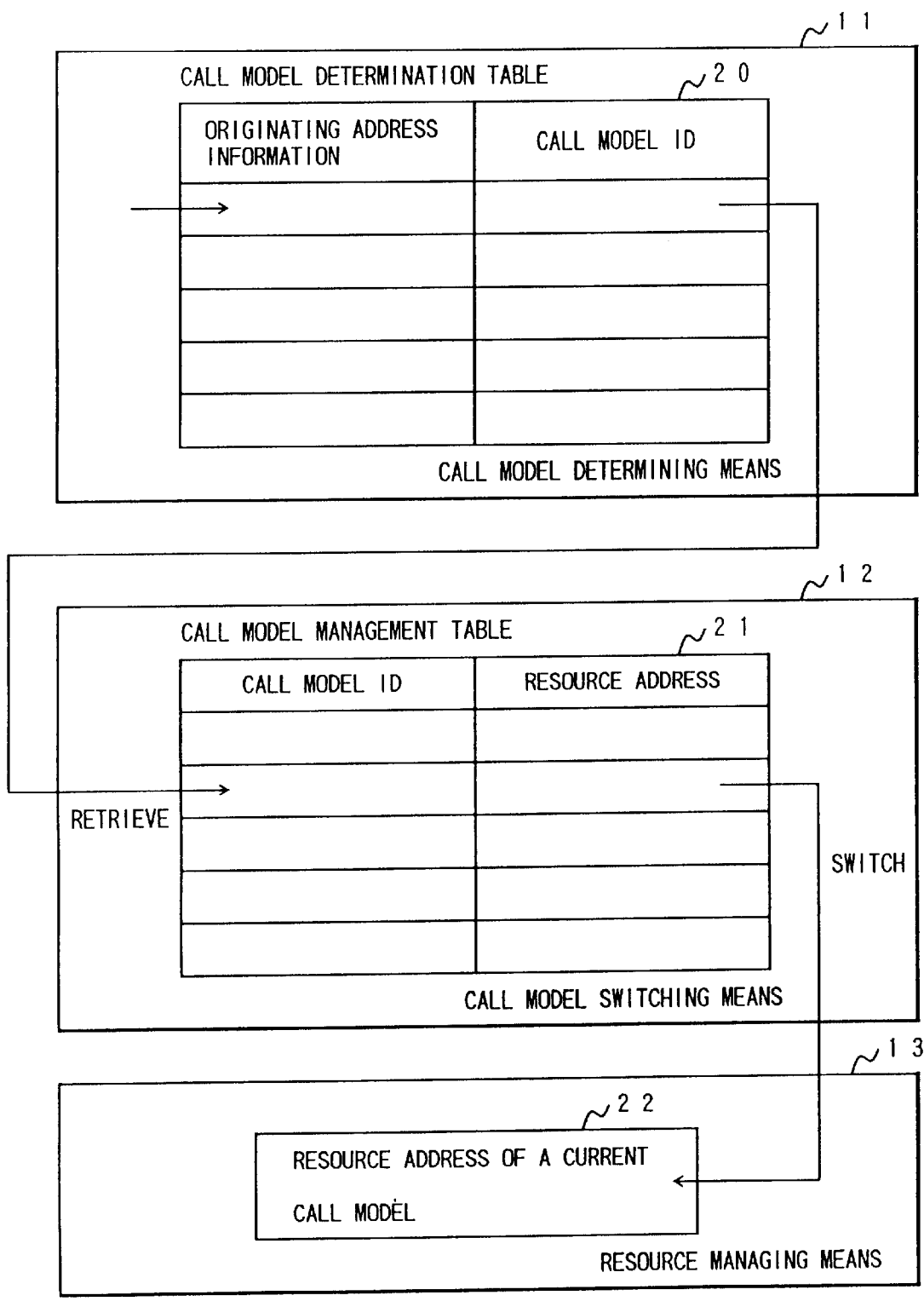
FIG. 3 shows a block diagram of a part of the SCP illustrated in FIG. 2.

Referring to FIG. 3, the call model determining unit 11, call model switching unit 12, and resource managing unit 13 will be described. As shown in FIG. 3, the call model determining unit 11 determines a call model by using a call model determination table 20.

The call model determination table 20 is a database in which each originating address information is related to a corresponding call model ID in advance. The originating address information may be an identification of a terminal device, for example a network address of the device, which sends a service control request message to the SSP4. Therefore, the call model determining unit 11 can search the corresponding call model ID by using the originating address information as a key. The call model ID is used in the SCP to identify a call model. It is possible to use a point code or a sub system number of a signal connection controller of a common channel signaling network of No. 7 type as the originating address information.

The call model switching unit 12 is a database in which each call model ID is related to a corresponding resource address. Therefore, the call model switching unit 12 can search an intended resource address by using the call model ID as a key. A resource is generated for each call model and the resource address is stored in the call model management table 21 when the call model managing process is initialized.

The corresponding resource address can be sent to the resource managing unit 13 as a resource address of the current call model according to the current call model ID. Next, the resource in the resource managing unit 13 can be accessed by using the resource address. The resource includes structure definitions and storage regions of the messages. As described above, the resource address includes an address of an area including a set of pointers each of which points to the structure definition or storage region. Therefore, the SCP according to the invention can retrieve the structure definition and the storage region, as a result, retrieve the parameters in the message in the same manner by referring to the resource in the resource managing unit 13 even if different call models of messages are given.

Figure 4:
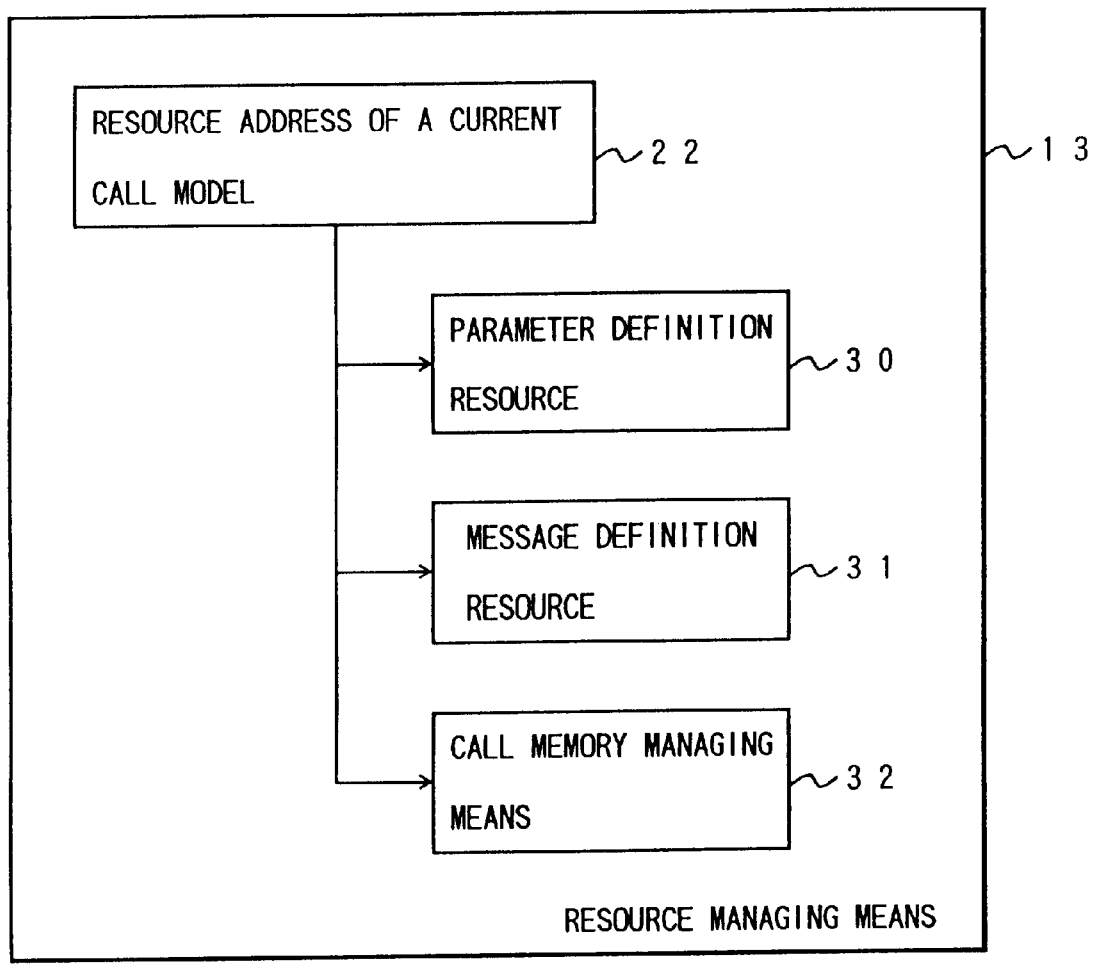
FIG. 4 shows a block diagram of a resource managing unit illustrated in FIGS. 2 and 3.

FIG. 4 is a block diagram showing the resource managing unit 13 in more detail. The resource managing unit 13 includes a resource, that is, structure definitions and storage regions. As shown in FIG. 4, the structure definitions correspond to a parameter definition resource 30 and a message definition resource 31, and the storage regions correspond to a call memory managing unit 32. Each pointer associated with a resource address 22 of the currently used call model (hereinafter, referred to as "current call model") points to the parameter definition resource 30, the message definition resource 31, and the call memory managing unit 32.

Hereinafter, an example of switching the resource address according to the current call model with respect to FIGS. 3 and 4 will be described. Now, it is assumed that the service logic program 15 refers to a resource address 21 in the call model management table 12 in FIG. 3.

The resource address 21 is supplied to the resource management unit 13 as a resource address 22 of the current call model. The resource address 22 includes three pointers which point to the beginning point of the parameter definition resource 30, the message resource 31, and the call memory management unit 32 for the current call model in FIG. 4, respectively.

It is possible to store the message and read the message stored, by using the parameter definition resource 30, the message resource 31, and the call memory management unit 32. Therefore, when the service logic program 15 obtains the addresses of the beginnings of the parameter definition resource 30, the message resource 31, and the call memory management unit 32 by referring to the pointers, the resultant service logic program 15 can access parameters in the message by controlling addresses relative to the beginning addresses.

Because resource addresses 21 are expected to take different values according to the call model, the service logic program 15 can access the messages for different call models in a similar accessing manner.

Figure 5:
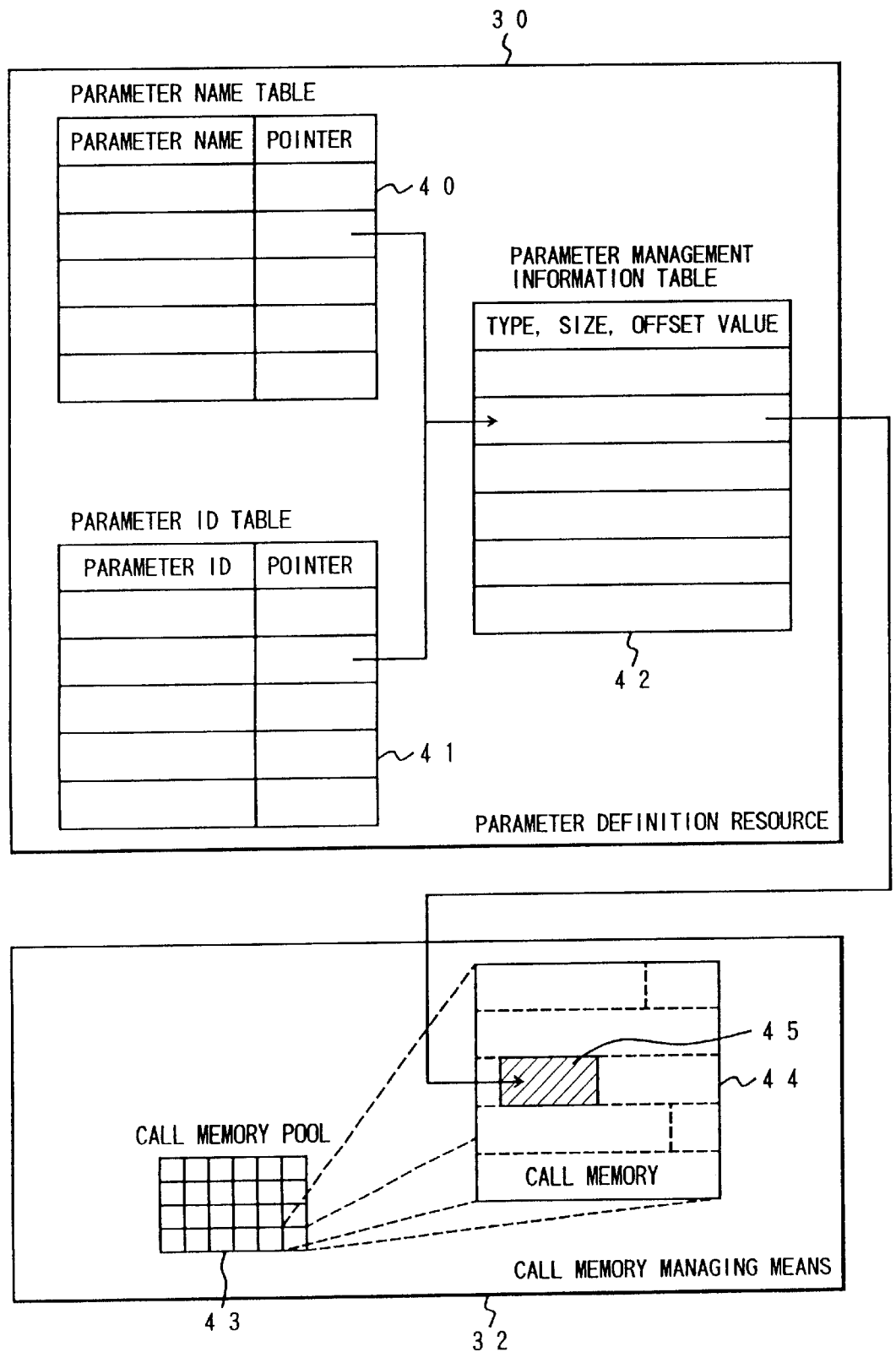
FIG. 5 shows a block diagram for use in describing a part of the resource managing unit illustrated in FIG. 4.

FIG. 5 is a block diagram showing an internal structure of the parameter definition resource 30 and the call memory managing unit 32 in more detail. As shown in FIG. 5, the call memory managing unit 32 manages a call memory pool 43 which is a set of a plurality of call memories 44.

Here, a single call memory 44 is generally assigned to a single service which is achieved by a single service logic program 15. The call memory 44 is a constant volume buffer inasmuch as the logic program 15 uses the whole volume of the call memory 44 as a single area. The call memory 44, however, can be used as areas 45 storing a value of a parameter corresponding to attribute data which are defined in a parameter management information table 42 in the parameter definition resource 30, by subdividing the call memory 44 into smaller areas 45. The attribute data in the parameter management information table 42 are defined for each parameter and can include type, size value, and offset value of the parameter.

Also, to identify an area 45 in the call memory 44, the offset value is used to show the distance from the beginning point of the call memory 44 to the beginning point of the area 45, and the size value is used to show the length of the area 45. Furthermore, by designating the type, it is possible to define behavior about the parameter in the service logic program 15.

On the other hand, it is possible to use either a parameter name table 40 or a parameter ID table 41 for retrieving the attribute data from the parameter management information table 42. That is, retrieving with a parameter name is mainly employed by the service logic program 15 via the resource accessing unit 14. While, retrieving with a parameter ID is mainly employed by using the message definition resource 31 which will be described below.

Figure 6:
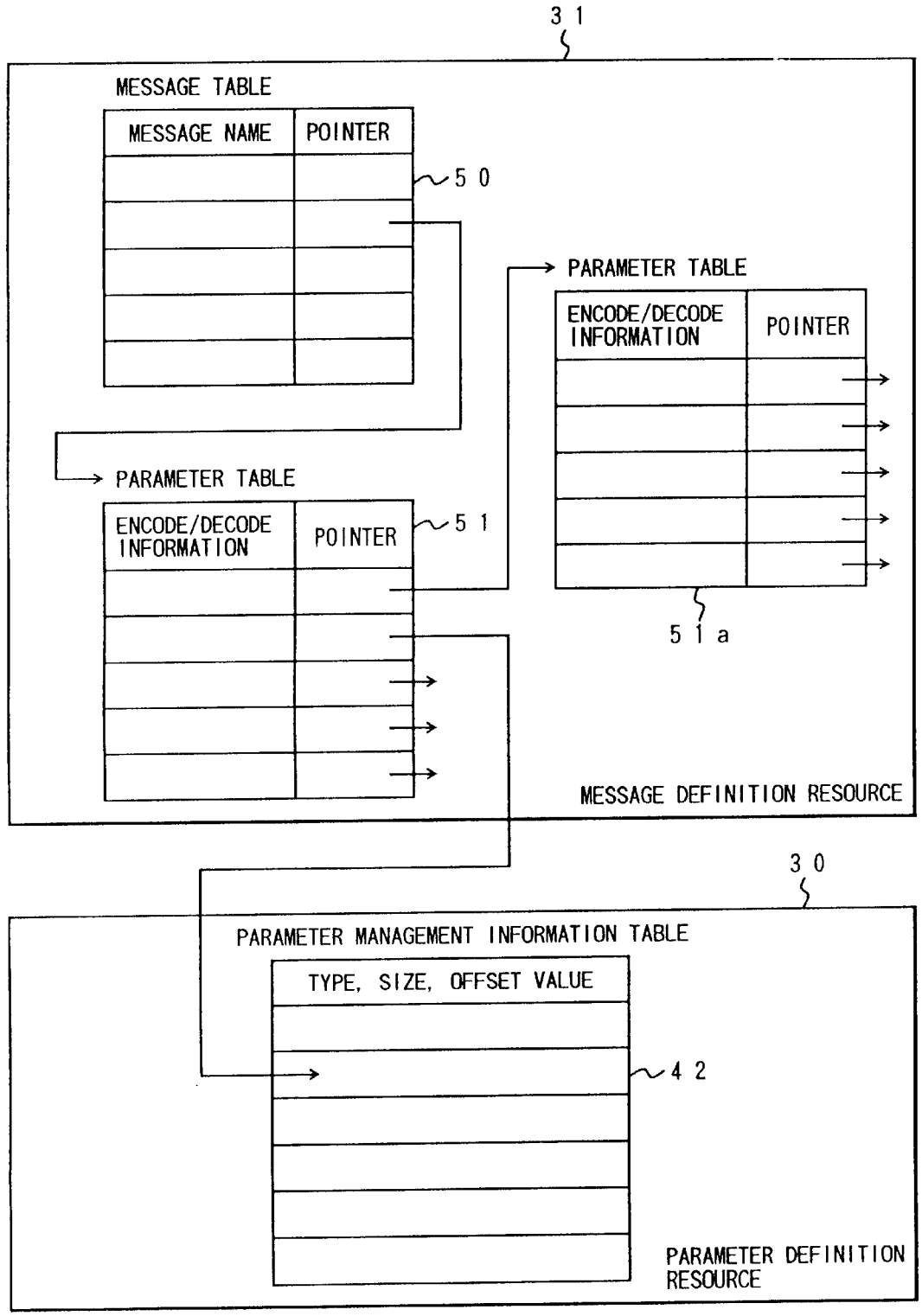
FIG. 6 shows a block diagram for use in describing another part of the resource managing unit illustrated in FIG. 4.

FIG. 6 is a block diagram showing the message definition resource 31 in more detail. As shown in FIG. 6, the message definition resource 31 includes a message table 50 and a parameter table 51. The message table 50 includes message names of a service control request message which belongs to the intended call model and pointers associate the message names with corresponding entries in the parameter table 51. The parameter table 51 includes encode/decode information for subdividing the service control request message into individual parameters and pointers which associate the encode/decode information, that is a list of parameters included in each message, with corresponding entries in the parameter management information table 42 in the parameter definition resource 30. Also, since some parameters in the message may have nested structure, the pointers in the parameter table 51 may be related to the entries in another table 51a shown in FIG. 6.

In FIG. 6, following the pointers in the tables in the message definition resource 31 leads to an entry of the parameter management information table 42.

Figure 7:
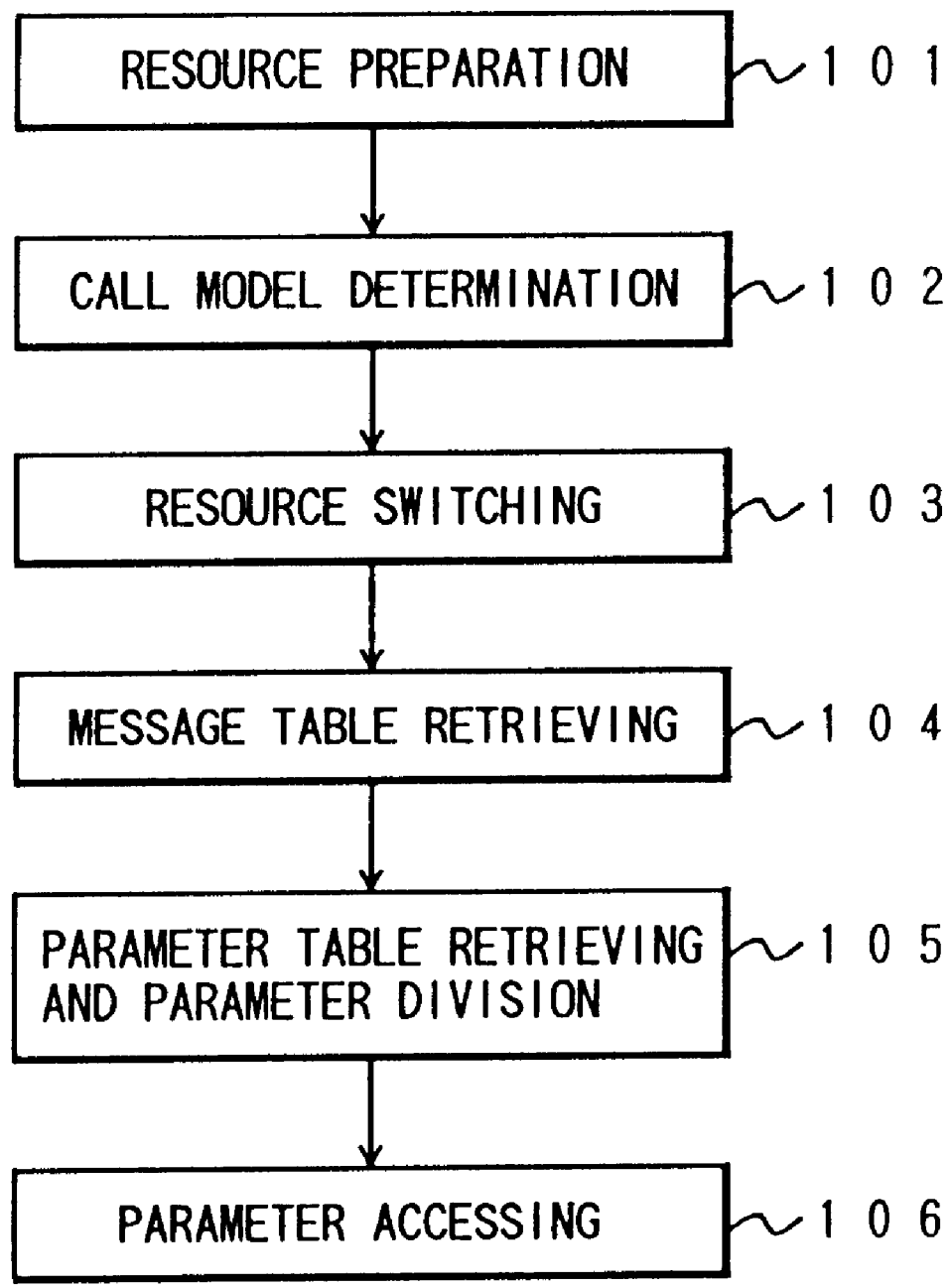
FIG. 7 shows a flow chart for use in describing operations of the SCP call control system shown in FIG. 2.

An operation of the invention configured as described above will be described in more detail with respect to FIG. 7. FIG. 7 is a flow chart showing an operation of the SCP call control system shown in FIG. 2.

First, at a step 101, the SCP is initialized before receiving a service control request message from a user. Simultaneously, the SCP is supplied with data pertaining to possible call models and necessary resources are generated to prepare tables for accessing the messages.

Next, at a step 102, the SCP uses originating address information and a call model determination table 20 to determine a call model ID when it receives a service control request message from an SSP.

At a step 103, the SCP uses the call model ID and a call model management table 12 to determine a resource address, and switches a resource address of the current call model to the resource address which is determined.

At a step 104, the SCP successively traces or follows pointers, from a pointer in the message table 50 to a pointer in the parameter table 51, to identify entries in the parameter management information table 42 corresponding to parameters in the received service control request message.

At a step 105, the SCP divides the service control request message into parameters according to the entries in the parameter management information table 42. Next, for each parameter, the SCP obtains information including type, size, and offset value from the corresponding entry in the parameter management information table 42. Then, the SCP stores the value of the parameter in an area 45 in the call memory 44 according to the information from the parameter management information table 42. The offset value is representative of a distance from the beginning point of the call memory 44 to the beginning point of an area 45 in which the value of the parameter should be stored. These operations are repeated until all the parameters have been stored in the call memory 44.

At a step 106, the SCP accesses an actual value of a parameter stored in an area 45 by a service logic program 15 using a parameter name or parameter ID as a key through a resource accessing unit 14.

An embodiment of the invention which is configured to realize the above structure will briefly be described below. An SCP is connected to two SSPs: one of them uses an old call model and the other uses a new call model different from the old call model. Now, the case where each SSP sends a service control request message to the SCP independently of each other will be considered.

The SCP can deal with these two SSPs by processing each service control request message after switching to a resource corresponding to the service control request message. For example, an encode/decode information registered in the parameter table 51 includes tag information of ASN.1 (Abstract Syntax Notation 1) to deal with INAP (Intelligent Network Application Protocol) messages.

Also, a pointer is used to link an entry in a table to another entry in another table. Alternatively, another method can be realized by linking a common ID included in both entries.

Similarly, to deal with a message having structure, the encode information and decode information include sizes and offset values. Then the SCP divides a message into parameters according to information of the parameter table (s) 51(51a), then stores each parameter into an area 45 in a call memory 44 at an address designated by the offset value in the parameter management information table 42.

As a result, if the SCP receives a service control request message from either of the SSPs, the service logic program 15 can obtain an intended value of each parameter from the call memory 44 in the same manner.

For example, it is assumed that provision is made for a scenario SA for a call model A and a scenario SB for another call model B. Herein, the scenario means definitions of processing or behavior when a value of a parameter in a service control request message is given. The scenarios SA and SB may define the same processing according to values of common items in both messages. However, a unique scenario which uses an item which is not included in the other call model messages may be produced.

In both cases, an access module, such as a service logic program 15 accessing the scenario, can read the parameter in the message by only designating a parameter name or a parameter ID, without recognition of data type, data size, or offset location of the parameter.

As described above, since the invention can select call models according to a source of a service control request message, simultaneous connection to the SSPs each of which uses a different call model is allowable. Therefore, the SCP of the invention can maintain its service even if a call model used by an SSP is changed. However, it is noted that the invention can select the call models by using another basis, for example one or more identifiers in the message.

Further, since structures of messages and locations in which parameters should be stored are determined in a data driven manner, encoding/decoding of the parameters or accessing the parameters can be adjusted according to received service control request messages.

Therefore, it will be easy to deal with a new call model and to modify an existing call model by using the invention.

While the embodiment of the invention has been described with respect to SCP and SSP in an IN, the embodiment is merely illustrative. For example, it is possible that the invention can be applied to the other various functional elements in various messaging systems.

Also, while a person skilled in the art may think of modifications and variations of the invention, the invention covers these that fall within the spirit of the invention.

What is claimed is:

1. In an SCP call message control system in an intelligent network having a plurality of service switching points (SSPs) each of which uses a call model different from each other, and having at least one service control point (SCP), the plurality of SSPs are configured to send service control request messages each including a source address, the SCP comprising:
a call model determining means for extracting the source address from the received service control request message and determining a call model corresponding to the source address;
a call model switching means for switching to a resource address of the determined call model;
a resource managing means for managing a resource of a currently used call model; and
a resource accessing means for allowing a service logic program actually providing a service to access the switched resource.

2. The system as claimed in claim 1, wherein the call model determining means comprises a call model determination table in which each source address corresponds to a call model ID.

3. The system as claimed in claim 1, wherein the call model switching means comprises a call model management table in which each call model ID corresponds to the resource address.

4. The system as claimed in claim 1, wherein the resource managing means comprises a parameter definition resource which includes information for managing parameters, a message definition resource which includes information for encoding/decoding the service control request messages, and buffers for storing the contents of the parameters.

* * * * *